UNITED STATES PATENT OFFICE.

AVANDO WARREN HUSSEY VIVIAN, OF LONDON, ENGLAND, ASSIGNOR TO THE COMPOSITE FUEL SYNDICATE LIMITED, OF LONDON, ENGLAND.

MANUFACTURE OF ARTIFICIAL FUEL.

No. 900,619.     Specification of Letters Patent.     Patented Oct. 6, 1908.

Application filed November 24, 1906. Serial No. 344,913.

*To all whom it may concern:*

Be it known that I, AVANDO WARREN HUSSEY VIVIAN, engineer, a subject of the King of Great Britain, residing at London, England, have invented certain new and useful Improvements in or Relating to the Manufacture of Artificial Fuel, of which the following is a specification:

This invention relates to artificial fuel and has for its object to produce a fuel which can be made of high calorific value if desired and having numerous advantages such as cheapness of production, non-liability to breakage or disintegration in handling or transportation, which is non-hygroscopic and which during combustion will retain its formation, will not tend to form clinker in the furnace, and will leave only a small percentage of ash, etc.

According to the present invention I proceed as follows and employ the following components:—(1) Carbonaceous material usually coal or if desired lignite, brown coal, coke, peat, or the like may be used—in a more or less finely divided condition; all of which materials for the sake of brevity I will hereinafter refer to as "carbonaceous material." (2) Lime or chalk. (3) Water. (4) Oil; waste oil or residuum, astatki, mazout, creosote oil, fuel oil, solar or intermediate oil, or other liquid hydrocarbons such as crude petroleum oil, etc. (all of which for the sake of brevity I will hereinafter refer to as the "oil") which has been specially treated as hereinafter specified. (5) A special binder or cementitious material as hereinafter defined.

The lime or chalk may in some cases be dispensed with.

According to my invention I treat the oil with certain materials thereby increasing the density or viscosity thereof before incorporating it with the aforesaid fuel components and I employ therefor any suitable chemical means for example I mix with the oil either suitable manganese or alkaline salts or sulfates such as manganese borate or hydroxid or sulfate or potassium or sodium hydroxid or carbonate or sulfate or borate, or barium super-oxid or sodium chlorid or nitric acid or I advantageously treat the oil by sulfurizing it and in practice I have obtained excellent results by employing chlorid of sulfur for this purpose.

The cementitious material according to this invention is a magnesia cement *i. e.* a cement which is made essentially of a chlorid advantageously chlorid of magnesium and calcined magnesite, these two substances being brought together under suitable conditions and with the addition of other salts or oxids either with or without acids as has heretofore been done in the preparation of magnesia cements.

The calcined magnesite should advantageously contain a percentage of carbonic acid say from 2% to 5% and should be mixed with the requisite amount of magnesium chlorid. Instead of or in addition to the magnesium chlorid other salts or acids may be used such as calcium chlorid, barium chlorid, or zinc chlorid, hydrochloric acid, nitric acid, sulfuric acid or acetic acid.

The quick binding properties of such a cementitious material may be improved by the addition of ammonia, salammoniac, carbonate of ammonia, nitric acid, sulfuric acid, Epsom salts, or Glauber salts and the non-hygroscopic qualities may be improved by the addition of chlorid of lead, sugar of lead, silica, silicate of sodium or potassium.

An advantageous method of making such a cementitious material suitable for the purpose of using in artificial fuel according to this invention is to take powdered magnesite act thereon with sufficient hydrochloric acid to transform a portion say half the magnesite into magnesium chlorid and add a certain percentage of a silicate such as silicate of soda (say 1% to 5%). Then calcine the mixture at a low temperature in order to retain a percentage of carbonic acid.

The proportions may be varied within wide limits.

In practice I have found excellent results are obtained by employing as my cementitious material a material of the aforesaid character which is now on the market and is known commercially as "Petrifite". For the sake of brevity I will hereinafter refer to all such cementitious materials as "magnesite cement".

The proportion of the various components of the fuel especially the oil will depend upon the calorific value which it may be desired to impart to the fuel and also will depend to some extent upon the character and calorific value of the carbonaceous material and will vary in proportion with such calorific value; for example, the following proportions of the components may be employed:—

Coal dust ........ 65%
Oil ............. 30%
Lime ............ 3%
Magnesite cement. 2%
} By weight.

About 10% of water added to above. Or the following proportions of the components may be employed:—

Coal dust ........ 88½%
Oil ............. 7½%
Lime ............ 2%
Magnesite cement. 2%
} By weight.

About ten per cent. of water added to the above.

The above are merely given as illustrations and I do not confine myself in any way to the proportions stated.

In the case of the magnesite cement I have found 2% suitable whatever percentage of oil is employed but I may use a greater or less percentage of such magnesite cement if desired.

Now in making fuel according to this invention I find it advantageous that the liquids should be heated separately from the solids and that the liquids and the solids should be heated to different degrees (namely I find it advantageous to heat the solids to a higher degree of temperature than the liquids) before their incorporation with one another and by following out the hereinafter described process an artificial fuel having the above-mentioned properties may readily be made from the above components:—

Taking the solids first;—The coal in any suitable comminuted condition—advantageously in a finely powdered state—is placed by itself into a convenient receptacle, and in another receptacle I place the magnesite cement and (if used) the chalk; and I pass the contents of both these receptacles in a mixed condition through a grinding and mixing machine so that they may be ground together and thoroughly incorporated; or said materials may be ground separately and thereafter thoroughly mixed in any suitable mixing machine. This mixture is then passed through a superheater so constructed and arranged to act that every part of the mixture may become evenly heated (or as evenly heated as possible) throughout the mass; or this heating can be effected simultaneously with the mixing. If desired this thorough heating can be effected by the introduction of steam into the mass and in that case the amount of water added in the emulsion may be reduced proportionately or otherwise. The heat of the mass or mixture may for example be raised to a temperature of about 350° F.; or more or less as desired and according to varying circumstances and conditions.

The following is an example of oil treated for use in carrying the present invention into practice:—The oil such as Texas fuel oil is advantageously heated and has mixed therewith about ½% to 1½% of commercial sulfur chlorid ($SCl_3$) and after being stirred up is then ready for use. The oil having been treated as aforesaid and water and (if used) lime or chalk, in the aforesaid or other suitable proportions are placed in a mixing and heating vessel such as a steam jacketed mixer where they are mixed and heated until they become thoroughly incorporated and the emulsion thus formed is heated to a suitable temperature which advantageously is less than the temperature to which the mass of solid materials is heated as aforesaid— thus when the solids are heated up to a temperature of say 350° F. as aforesaid then this emulsion or body may advantageously be heated up to say 300° F. or thereabouts. The emulsion or body thus heated, and the mixture of solids heated as aforesaid, are then brought together and thoroughly mixed and incorporated in any suitable manner— as for example the said two bodies may be proportionately (and continuously) fed together and thoroughly mixed and the combined mass passed by a continuous process into a mold-wheel or other suitable press or briquetting machine; or this mixture of the aforesaid components may be accomplished in charges, that is to say a given quantity of the heated body of solids may be passed into a mixing vessel such as a pug containing the heated emulsion or body in proper proportion (or vice-versa) and this charge thoroughly stirred and mixed and then discharged, and the combined mass then passed through a plodder to the mold-wheel or other suitable press or briquetting machine and there made up into briquets of any suitable form and size as desired.

By the foregoing process I have manufactured excellent briquets from various kinds of coal (bituminous or anthracite or an admixture of both) with varying proportions of the specially treated oil namely I have successfully made briquets with 7½% of the specially treated oil up to as much as 40% of the specially treated oil and with various proportions between 7½% and 40% but I do not limit myself to these amounts as being the minimum and maximum.

As the result of my experiments it appears to me that in carrying out my invention vulcanization is in some cases obtained in the resultant fuel e. g. when the oil is treated with chlorid of sulfur or that I obtain a vulcanizing effect on the oil by means of the chlorid of sulfur and heat but whether this is so or not I do not commit myself in any way to this theory of vulcanization and it is here merely referred to as a possible explanation of the extremely satisfactory fuel produced by my invention.

In some cases—especially when a large proportion of the oil specially treated as aforesaid is used in the fuel—I find it advantageous to allow or cause the fuel compound after the completion of the mixing and heating thereof to then cool down considerably before proceeding to press it into briquets; such cooling if desired being artificially effected or accelerated by any suitable apparatus.

What I claim is:—

1. An artificial fuel in the form of briquets composed of carbonaceous material in a state of fine division; oil mixed with a suitable salt to increase its viscosity; lime; a cement consisting of chlorid of magnesium and calcined magnesite suitably treated and containing substantially from 2 per cent. to 5 per cent. carbonic acid, and sufficient water to bind all the parts together under pressure, substantially as described.

2. An artificial fuel in the form of briquets consisting of a compressed mixture of the following substances and in substantially the following proportions, coal dust 65 per cent.; oil treated with a suitable salt to increase its viscosity 30 per cent.; lime 3 per cent.; chlorid of magnesium and calcined magnesite mixed with suitable other salts to form a cement and containing substantially 2 per cent. to 5 per cent. carbonic acid and sufficient water to bind all the parts together, substantially as described.

3. The method of making artificial fuel comprising the mixing and heating together of carbonaceous material and a magnesite cement in a finely divided condition, the mixing and heating together of specially sulfurized oil and water, and the mixing together of the resultant masses, substantially as hereinbefore set forth.

4. The method of making artificial fuel comprising the mixing and heating together of carbonaceous material, and a magnesite cement and chalk, in a finely divided condition, the mixing and heating together of specially sulfurized oil and water and lime, and the mixing together of the resultant masses, substantially as hereinbefore set forth.

5. The method of making artificial fuel which comprises the mixing and heating of carbonaceous material and a magnesite cement, in a finely divided condition, the separate mixing and heating of oil which has been previously subjected to a sulfurizing process and water, and the mixing together of the resultant masses, substantially as and for the purposes hereinbefore set forth.

6. The method of making artificial fuel which comprises the mixing and heating of carbonaceous material, and a magnesite cement and chalk in a finely divided condition, the separate mixing and heating of oil which has been previously subjected to a sulfurizing process and water and lime, and the mixing together of the resultant masses, substantially as and for the purposes hereinbefore set forth.

7. The method of making artificial fuel, which comprises the mixing and heating of carbonaceous material and the magnesite cement known as petrifite, in a finely divided condition, the separate mixing and heating of a petroleum oil which has been subjected to the action of chlorid of sulfur and water, and the mixing together of the resultant masses, substantially as and for the purposes hereinbefore set forth.

8. The method of making artificial fuel, which comprises the mixing and heating of carbonaceous material and the magnesite cement known as petrifite, in a finely divided condition, the separate mixing and heating of a petroleum oil which has been subjected to the action of chlorid of sulfur and water and lime, and the mixing together of the resultant masses, substantially as and for the purposes hereinbefore set forth.

9. In the process of manufacturing artificial fuel from carbonaceous material and other components, the step of sulfurizing the oil which forms one of said components of said fuel before said oil is added to the carbonaceous material.

10. In the process of manufacturing artificial fuel from carbonaceous material and other components, the step of sulfurizing the oil which forms one of said components of said fuel before said oil is added to the carbonaceous material and after the admixture of said sulfurized oil with said components then applying heat thereto.

11. In the manufacture of artificial fuel—the employment of oil which has been specially treated with chlorid of sulfur previous to its incorporation with any of the other components of the fuel, substantially as and for the purposes hereinbefore set forth.

12. An artificial fuel made of carbonaceous material, water, specially sulfurized oil, and a magnesite cement.

In witness whereof I have hereunto set my hand in presence of two witnesses.

AVANDO WARREN HUSSEY VIVIAN.

Witnesses:
HENRY BIRKBECK.
H. D. JAMESON.